US006766453B1

United States Patent
Nessett et al.

(10) Patent No.: US 6,766,453 B1
(45) Date of Patent: Jul. 20, 2004

(54) AUTHENTICATED DIFFIE-HELLMAN KEY AGREEMENT PROTOCOL WHERE THE COMMUNICATING PARTIES SHARE A SECRET KEY WITH A THIRD PARTY

(75) Inventors: Danny M. Nessett, Fremont, CA (US); Albert Young, Cupertino, CA (US); Bob O'Hara, Santa Clara, CA (US); Joe Tsai, Saratoga, CA (US); Bofu Chen, Fremont, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/560,396

(22) Filed: Apr. 28, 2000

(51) Int. Cl.[7] ................................................ H04L 9/00
(52) U.S. Cl. ........................ 713/171; 455/410; 455/411
(58) Field of Search ................................. 713/171, 169; 380/283; 382/100; 455/410, 411

(56) References Cited

U.S. PATENT DOCUMENTS 4,933,969 A * 6/1990 Marshall et al. ............ 713/177
6,081,601 A * 6/2000 Raivisto ..................... 380/270
6,263,437 B1 * 7/2001 Liao et al. .................. 713/169
6,292,896 B1 * 9/2001 Guski et al. ................ 713/169
6,606,393 B1 * 8/2003 Xie et al. .................... 382/100

* cited by examiner

Primary Examiner—Kim Vu
Assistant Examiner—Thanhnga Truong

(57) ABSTRACT

The present invention provides a method and system for performing an authenticated Diffie-Hellman key agreement protocol over a network where the communicating parties share a secret key with a third party. In one embodiment, the network is a wireless network, wherein a wireless client electronic system (WC) and a network access point electronic system (AP) are the parties executing the authenticated Diffie-Hellman key agreement protocol. In this embodiment, the WC and the AP exchange a shared secret key for encrypting wireless communications between the wireless client electronic system and the network access point electronic system. In one embodiment, the WC shares a first secret key with a RADIUS server of the network. Similarly, the AP shares a second secret key with the RADIUS server of the network. The first and second secret keys are utilized for performing an authentication protocol.

55 Claims, 4 Drawing Sheets

AUTHENTICATED DIFFIE-HELLMAN KEY AGREEMENT PROTOCOL WHERE THE COMMUNICATING PARTIES SHARE A SECRET KEY WITH A THIRD PARTY

BACKGROUND OF THE INVENTION

1. Field of the Invention

The present invention generally relates to the field of networks. More particularly, the present invention relates to the field of network security.

2. Related Art

Computer systems and other electronic systems or devices (e.g., personal digital assistants, cellular phones, etc.) have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of a computer system or other type of electronic system is dramatically enhanced by coupling these stand-alone electronic systems together to form a networking environment. Within a networking environment, users may readily exchange files, share information stored on a common database, pool resources, and communicate via electronic mail (e-mail) and via video teleconferencing.

In a network environment, there are three basic techniques used to achieve mutual authentication between two parties, whereas each party is an electronic system within the networked environment such as a wireless client electronic system or a network access point electronic system. In the first basic technique, public key cryptography is used. According to public key cryptography, the two parties sign (i.e., provide a digital signature for) a message using their respective private keys, while they authenticate (i.e., verify the origin of) the message using the other party's public key. In the second basic technique, the two parties hold a shared secret. Each party signs a message using the shared secret, while the other authenticates the message using the shared secret. In the third basic technique, the two parties hold a shared secret with a third-party such as an authentication authority. Each party signs the message using the third-party shared secret. The message is forwarded to the third party by the receiving party for verification or transformation. When the third-party verifies, it simply tells the receiving party whether the message is authentic. When the third-party transforms, it re-signs the message with the receiving party's shared secret, returning it to the receiving party for verification.

Each of the three basic techniques has its strengths and weaknesses. From a purely security perspective, implementing public key cryptography is preferred over the other basic techniques. However, public key cryptography requires a significant public key infrastructure. For particular applications that do not need this public key infrastructure for other purposes (e.g., IPSec), deployment of the public key infrastructure can create a significant market barrier to prospective customers of network environment equipment.

The next preferred basic technique from a security perspective implements a secret shared between two parties. This basic technique is inferior to public key cryptography because signing a message with such a shared secret does not actually authenticate the sender of the message. This basic technique just raises the receiving party's confidence that the sender of the message knows the shared secret. This may seem like an insignificant distinction, but there are certain types of attacks against authentication protocols by using shared secrets (e.g., reflection attacks) that complicate those authentication protocols.

The third basic technique, i.e., implementing secrets shared with a third-party, is the least attractive from a security perspective. However, the third basic technique is, in many cases, the most attractive approach from a management and deployment point of view. The use of public key cryptography and shared secrets imposes non-trivial administration burdens on the deploying organization. As previously indicated, public key cryptography normally requires the deployment of a Public Key Infrastructure, which is costly from an initial investment as well as an operational perspective. Pair wise shared secrets require extensive management of those keys, since each sending party must obtain, store, and manage (e.g., revoke) the keys shared will all other parties in the network environment. When implementing secrets shared with a third party, each party need only obtain and store one key. Many secret key management functions can be centralized in the third-party itself.

Mutual authentication of two parties becomes important when they use Diffie-Hellman key agreement protocol to exchange an encryption key. For example, in wireless communications a network access point electronic system (AP) and a wireless client electronic system (WC) may use Diffie-Hellman to establish a cryptographically protected channel between them, so that wireless communications between the AP and the WC are protected. However, the Diffie-Hellman key agreement protocol is susceptible to a man-in-the-middle attack.

Therefore, what is needed is a method and system for performing an authenticated Diffie-Hellman key agreement protocol over a network where the communicating parties share a secret key with a third party.

SUMMARY OF THE INVENTION

Accordingly, the present invention provides a method and system for performing an authenticated Diffie-Hellman key agreement protocol over a network where the communicating parties share a secret key with a third party. In one embodiment, the network is a wireless network, wherein a wireless client electronic system and a network access point electronic system are the parties executing the authenticated Diffie-Hellman key agreement protocol. In this embodiment, the wireless client electronic system and the network access point electronic system exchange a shared secret key for encrypting wireless communications between the wireless client electronic system and the network access point electronic system. In one embodiment, the wireless client electronic system shares a first secret key with a RADIUS server of the network. Similarly, the network access point electronic system shares a second secret key with the RADIUS server of the network. The first and second secret keys are utilized for performing an authentication protocol.

According to one embodiment, the wireless client electronic system signs (with the first secret key) a first message containing a first variable for the Diffie-Hellman key agreement protocol. The message from the wireless client electronic system also includes a first identifier corresponding to the wireless client electronic system, whereas "sign" refers to generating a message authentication code which is then coupled to the message. The wireless client electronic system transmits the first message to the network access point electronic system.

The network access point electronic system signs (with the second secret key) a second message containing a second variable for the Diffie-Hellman key agreement protocol and a second identifier corresponding to the network access point electronic system. The network access point electronic system transmits the first message and the second message to the RADIUS server.

The RADIUS server authenticates the first message and the second message, utilizing the first identifier and the second identifier to retrieve the first secret key and the second secret key from a memory storage location. If the authentication is successful, the RADIUS server re-signs (with the first secret key) the second message and re-signs (with the second secret key) the first message. The RADIUS server transmits the re-signed first message and the re-signed second message to the network access point electronic system.

The network access point electronic system authenticates the re-signed first message and generates the shared secret key for encrypting communications if the authentication protocol is successful. If the authentication protocol is successful, the network access point electronic system transmits the re-signed second message to the wireless client electronic system. An authentication protocol is then performed by the wireless client electronic system and the shared secret key for encrypting communications is generated by the wireless client electronic system if the authentication protocol is successful.

Hence, the authenticated Diffie-Hellman key agreement protocol of the present invention avoids the man-in-the-middle attack. In addition, the authenticated Diffie-Hellman key agreement protocol of the present invention implements an authentication protocol requiring each wireless client electronic system and each network access point electronic system to manage no more than one secret key for authentication purposes.

These and other advantages of the present invention will no doubt become apparent to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the present invention.

Figure 1:
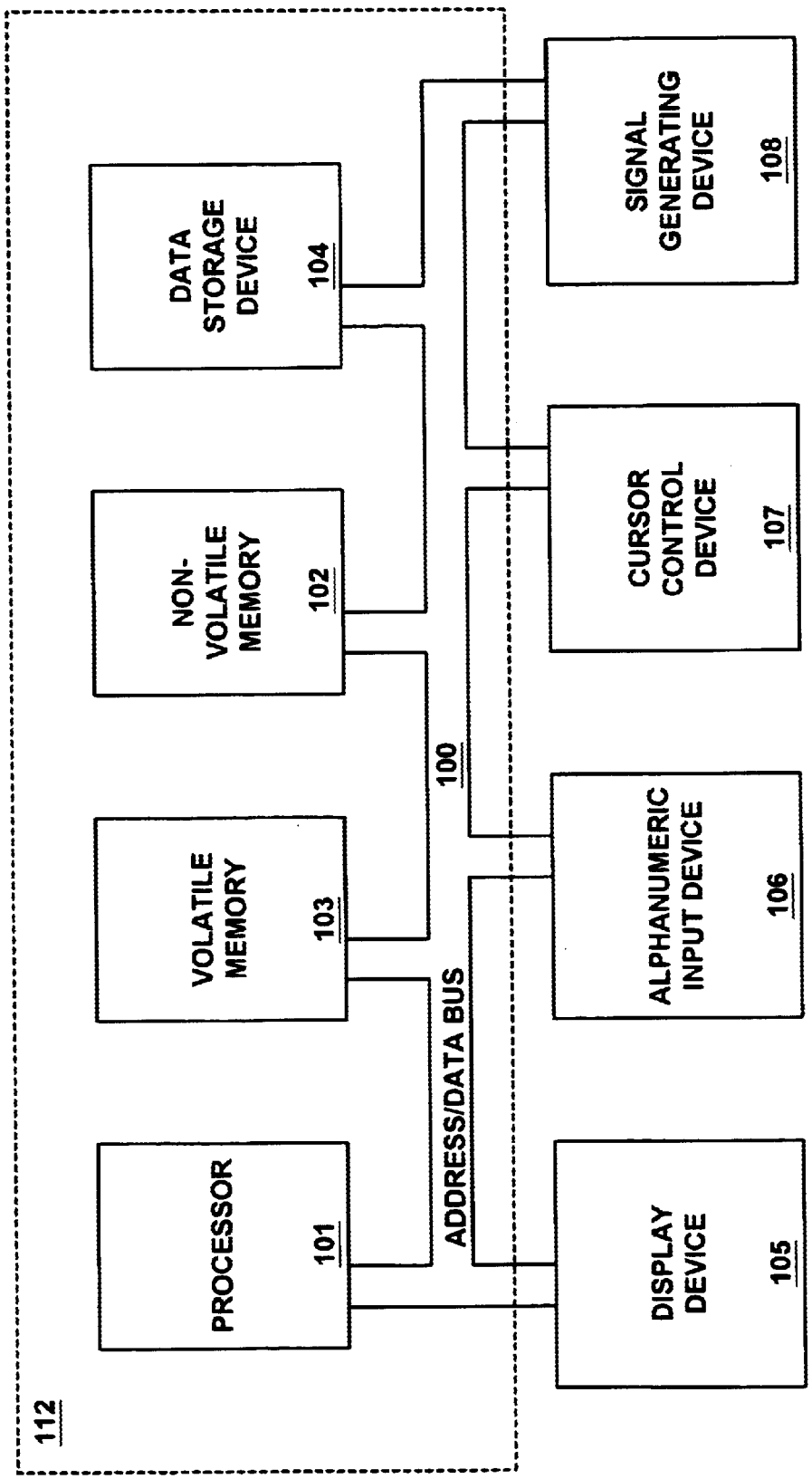
FIG. 1 illustrates an exemplary electronic system platform upon which embodiments of the present invention may be practiced.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in to order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating", "canceling", "assigning", "receiving", "forwarding", "dumping", "updating", "bypassing", "transmitting", "determining", "retrieving", "displaying", "identifying", "modifying", "processing", "preventing", "using", "sending", "adjusting" or the like, refer to the actions and processes of an electronic system or a computer system, or other electronic computing device/system such as a personal digital assistant (PDA), a cellular phone, a pager, etc. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Exemplary Electronic System

With reference to FIG. 1, portions of the present invention are comprised of computer-readable and computer executable instructions which reside, for example, in computerusable media of an electronic system such as a computer system. FIG. 1 illustrates an exemplary electronic system 112 on which embodiments of the present invention may be practiced. It is appreciated that the electronic system 112 of FIG. 1 is exemplary only and that the present invention can operate within a number of different computer systems including general-purpose computer systems and to embedded computer systems.

Electronic system 112 includes an address/data bus 100 for communicating information, a central processor 101 coupled with bus 100 for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Electronic system 112 also includes a data storage device 104 ("disk subsystem") such as a magnetic or optical disk and disk drive coupled with the bus 100 for storing information and instructions. Data storage device 104 can include one or more removable magnetic or optical storage media (e.g., diskettes, tapes) which are computer readable memories. Memory units of electronic system 112 include volatile memory 102, non-volatile memory 103 and data storage device 104.

Electronic system 112 can further include an optional signal generating device 108 (e.g., a wireless network interface card "NIC") coupled to the bus 100 for interfacing with other computer systems. Also included in exemplary system 112 of FIG. 1 is an optional alphanumeric input device 106 including alphanumeric and function keys coupled to the bus 100 for communicating information and command selections to the central processor 101. Electronic system 112 also includes an optional cursor control or directing device 107 coupled to the bus 100 for communicating user input information and command selections to the central processor 101. An optional display device 105 can also be coupled to the bus 100 for displaying information to the computer user. Display device 105 may be a liquid crystal device, other flat panel display, cathode ray tube, or other display device suitable for creating graphic images and alphanumeric characters recognizable to the user. Cursor control device 107 allows the user to dynamically signal the two dimensional movement of a visible symbol (cursor) on a display screen of display device 105. Many implementations of cursor control device 107 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 106 using special keys and key sequence commands.

Exemplary Network Environment

Figure 2:
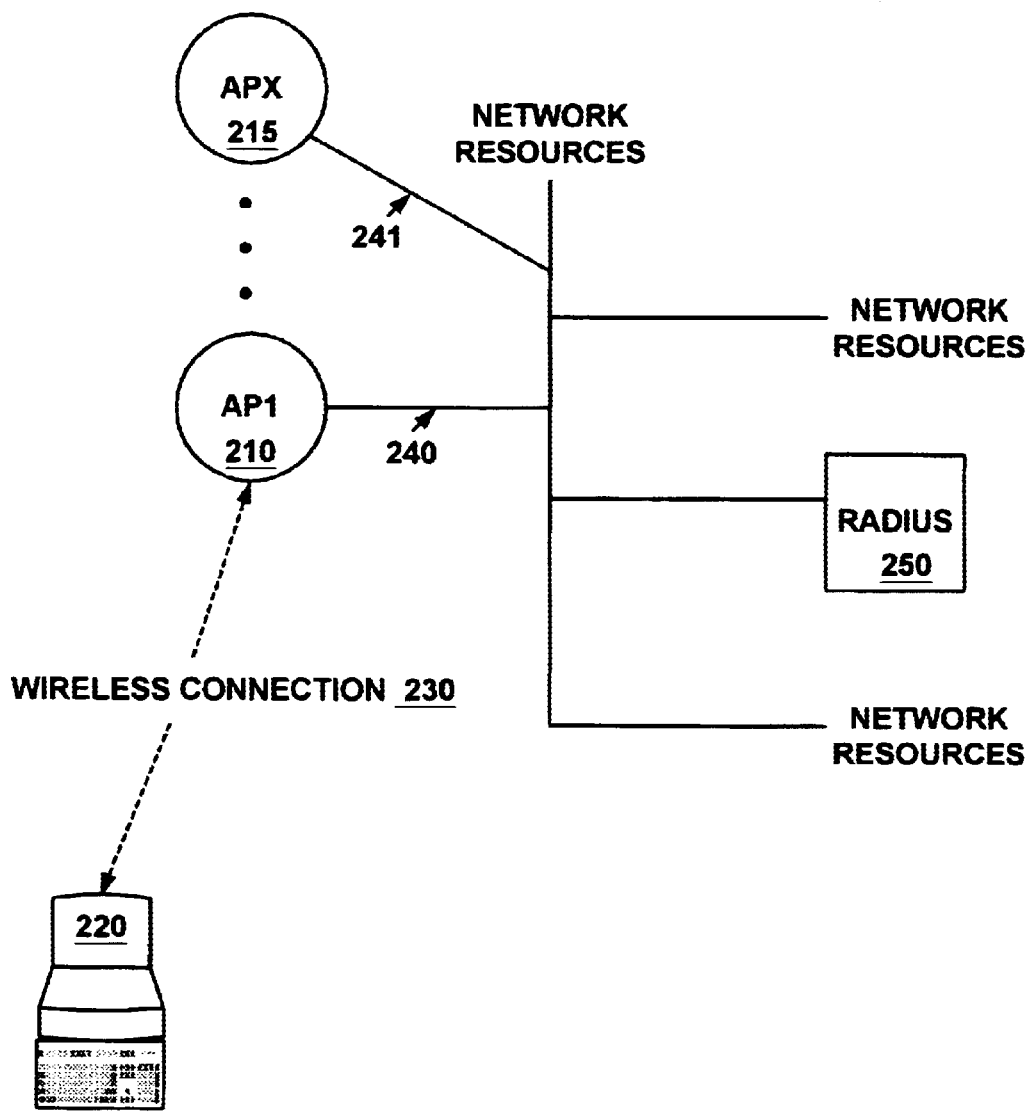
FIG. 2 is a graphical representation of an exemplary wireless network in which embodiments according to the present invention may be practiced.

Embodiments of the present invention, a method and system for performing an authenticated Diffie-Hellman key agreement protocol over a network where the communicating parties share a secret key with a third party, may be practiced in a wireless network environment. FIG. 2 illustrates an exemplary wireless network 200 in which embodiments of the present invention may be practiced. As illustrated, wireless network 200 includes a network access point electronic system (AP1) 210 that is coupled to a wireless client electronic system (WC) 220 via a wireless connection 230. More than one wireless client electronic system may be coupled to the wireless network 200. In addition, the wireless network 200 may include one or more additional network access point electronic systems (APX) 215. There are many techniques for implementing wireless connection 230, including infrared transmission, spread spectrum radio transmission, narrowband radio transmission, or some other technology that does not require a physical connection between the wireless client electronic system and the network access point electronic system. AP1 210 and APX 215 may be implemented with an electronic system (e.g., electronic system 112). In the present embodiment, the AP1 210 and APX 215 are coupled to a number of network resources (e.g., file servers, printers, Internet gateways, etc.) via connection 240 and connection 241 respectively.

Additionally, the wireless network 200 includes a RADIUS server 250. The RADIUS server 250 functions as a third party (i.e., an authentication resource) during the authenticated Diffie-Hellman key agreement protocol of the present invention. Each network access point electronic system 210 and 215 shares a separate secret key with the RADIUS server 250 for performing an authentication protocol. Similarly, each wireless client electronic system 220 shares a separate secret key with the RADIUS server 250 for performing an authentication protocol. The RADIUS server 250 stores each secret key according to a unique identifier assigned to each network access point electronic system and to each wireless client electronic system. When the RADIUS server 250 receives a message requiring authentication, the RADIUS server 250 looks-up the secret key corresponding to the unique identifier transmitted to along with the message to the RADIUS server 250. The RADIUS server 250 authenticates the message with the secret key corresponding to the unique identifier.

Additionally, the RADIUS server 250 stores additional information corresponding to each network access point electronic system 210 and 215 and each wireless client electronic system 220. For example, the RADIUS server 250 stores a designator for each unique identifier, whereas the designator specifies whether the unique identifier is that of a wireless client electronic system or that of a network access point electronic system. Thus, the wireless client electronic system 220 and the network access point electronic system 210 and 215 can determine whether it is appropriate to communicate with the other party. It should be understood by one of ordinary skill in the art that the third party or authentication resource can be implemented as another server, as a RADIUS server and a backend server coupled to the RADIUS server, or as any other appropriate implementation.

In conventional wired networks where communication is relatively secure, a client electronic system may transmit and receive information (i.e., communicate) via the wired network without any encryption. However, in the wireless network 200, communications between the AP1 210 and the WC 220 can be easily intercepted by casual eavesdroppers and intruders. The Diffie-Hellman key agreement protocol enables two parties (e.g., AP1 210 and WC 220) to establish a shared secret key for encrypting communications between the parties. According to the present invention, an authenticated Diffie-Hellman key agreement protocol avoids the man-in-the-middle attack and provides reasonable secret key management by utilizing a third party (i.e., RADIUS server 250) for authenticating the parties (e.g., AP1 210 and WC 220). Thus, the parties (e.g., AP1 210 and WC 220) are responsible for managing no more than one secret key for authentication purposes.

According to one embodiment, the network access point electronic system 210 and the wireless client electronic system 220 sign a second message and a first message, respectively. The first message and the second message are transmitted to the RADIUS server 250 according to a RADIUS protocol. The RADIUS server 250 authenticates the first and second messages. If the authentication protocol is successful, the RADIUS server 250 re-signs the first and the second messages. The RADIUS server 250 transmits the re-signed first and second messages according to a RADIUS protocol. The network access point electronic system 210 authenticates the re-signed first message. The wireless client electronic system 220 authenticates the re-signed second message. If authentication is successful, the wireless client electronic system 220 and the network access point electronic system 210 generate the shared secret key for encrypting communications between the wireless client electronic system 220 and the network access point electronic system 210.

In one embodiment, the wireless client electronic system 220, the network access point electronic system 210, and the RADIUS server 250 sign the message by generating a Message Authentication Code (MAC) of the message. The MAC can be a hash message authentication code, implemented with a one-way hash function (e.g., HMAC-MD-5, HMAC-SHA-1, etc.). It should be understood by one skilled in the art that the MAC can be implemented in any other appropriate manner.

Moreover, in one embodiment, the authenticated Diffie-Hellman key agreement protocol is implemented based on modular arithmetic. Alternatively, the authenticated Diffie-Hellman key agreement protocol can be implemented based on elliptic curve cryptography or based on any other mathematical group suitable for Diffie-Hellman key agreement.

Authenticated Diffie-Hellman Key Agreement Protocol

Figure 3A:
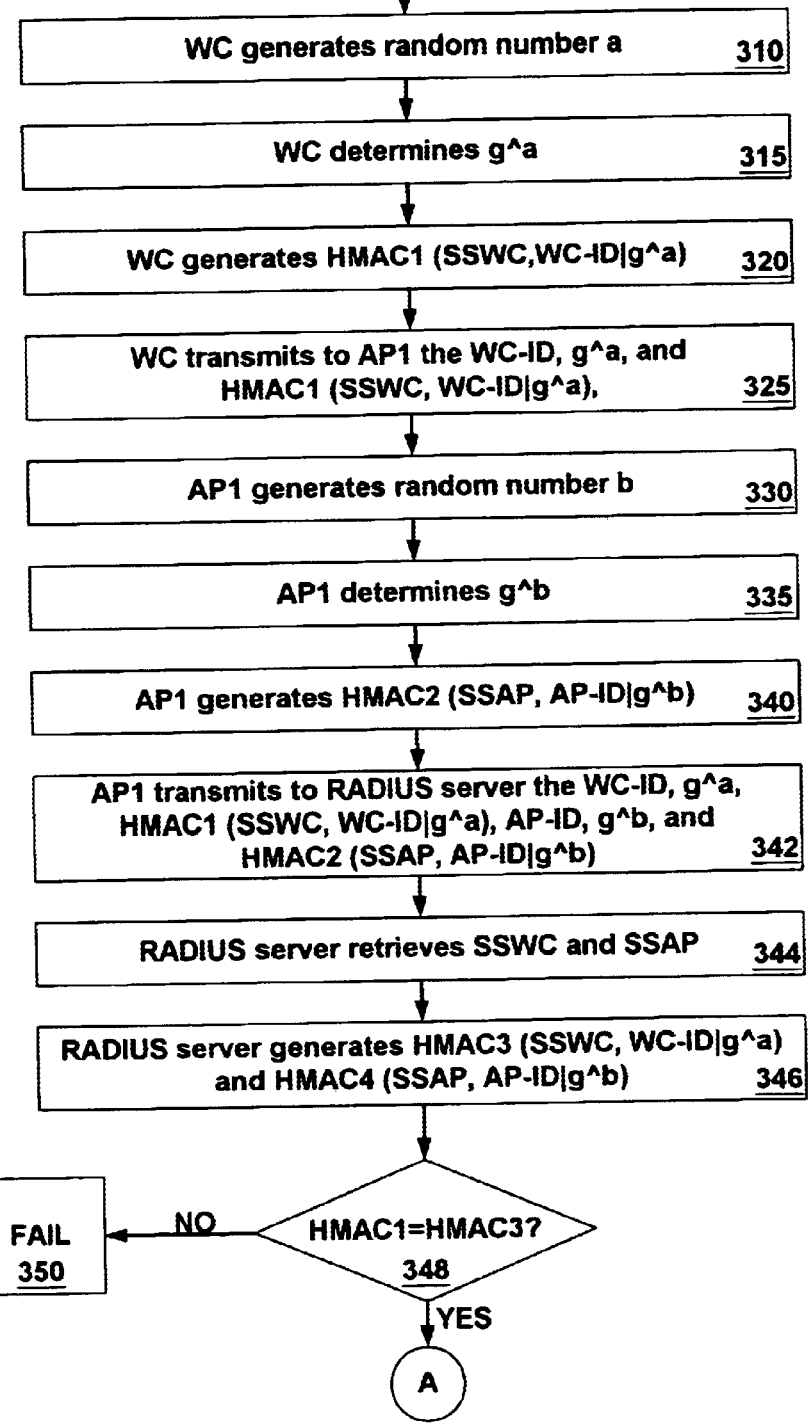
FIG. 3 is a flow chart diagram illustrating steps of an authenticated Diffie-Hellman key agreement protocol where the communicating parties share a secret with a third party in accordance with one embodiment of the present invention.
Figure 3B:
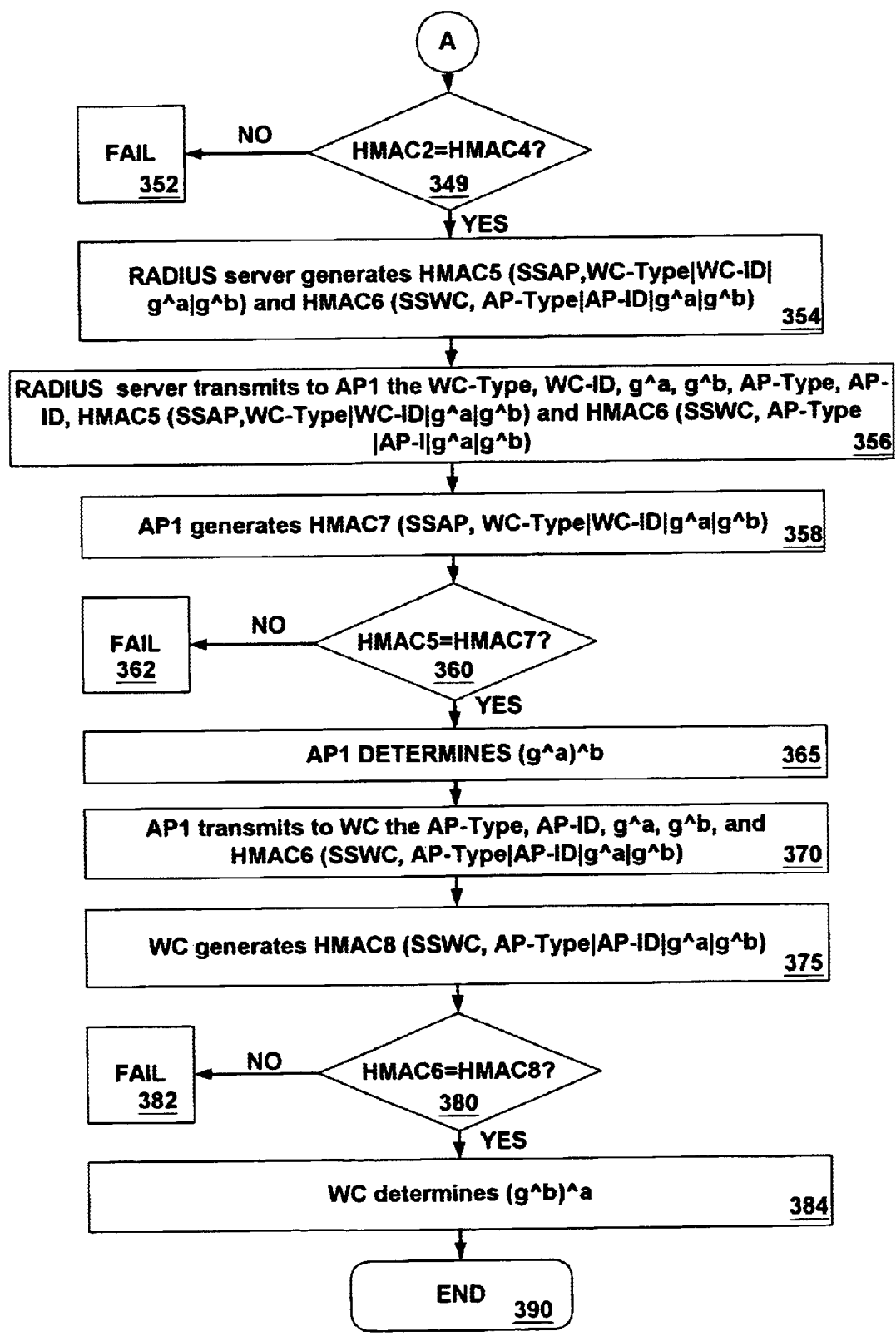

FIG. 3 is a flow chart diagram 300 illustrating steps of an authenticated Diffie-Hellman key agreement protocol where the communicating parties or communicators (e.g., AP 210 and WC 220 of FIG. 2) share a secret with a third party (e.g., RADIUS server 250 of FIG. 2) in accordance with one embodiment of the present invention. A communicating party can also be any party other than a network access point electronic system or a wireless client electronic system. The authenticated Diffie-Hellman key agreement protocol of the present invention enables AP1 210 and WC 220 to transfer a shared secret key for encrypting communications between AP1 210 and WC 220, while the Radius server 250 authenticates AP1 210 (with the secret key which AP1 210 and the RADIUS server 250 share) and authenticates WC 220 (with the secret key which WC 220 and the RADIUS server 250 share). Thus, secret key management for authentication purposes is significantly reduced since each network access point electronic system does not need to manage a separate secret key for each wireless client electronic system in the network environment.

At step 305, the authenticated Diffie-Hellman key agreement protocol of the present invention begins, whereas the network access point electronic system (AP1) 210 and the wireless client electronic system (WC) 220 are the communicating parties or communicators. The RADIUS server 250 is the third party or authentication resource, which shares separate secret keys with WC 220 and AP1 210. As discussed above, WC 220 shares a first secret key SSWC with the RADIUS server 250, whereas the first secret key SSWC enables WC 220 and the RADIUS server 250 to mutually authenticate each other. AP1 210 shares a second secret key SSAP with the RADIUS server 250, whereas the second secret key SSAP enables AP1 210 and the RADIUS server 250 to mutually authenticate each other. WC 220 is assigned a first identifier WC-ID so that the RADIUS server 250 can index the first secret key SSWC. AP1 210 is assigned a second identifier AP-ID so that the RADIUS server 250 can index the second secret key SSAP.

At step 310, WC 220 generates the random number a. The security of the authenticated Diffie-Hellman key agreement protocol depends on a low probability that WC 220 and AP1 210 will generate the same random number twice during their lifetime. Additionally, the security depends on the lack of auto correlation in the random number stream generated by WC 220.

At step 315, WC 220 determines a first variable $g^a$, whereas the notation $g^a$ means g raised to the power a modulo m or $[(g^a)\bmod m]$. The generator g and the modulus m are well known. This embodiment implements Diffie-Hellman variables based on modular arithmetic. It should be understood by one of ordinary skill in the art that the Diffie-Hellman variables can be implemented based on elliptic curve cryptography.

At step 320, WC 220 generates a first message authentication code HMAC1 of a first concatenation (WC-ID|$g^a$) using the first secret key SSWC. The first concatenation (WC-ID|$g^a$) comprises the first identifier WC-ID and the first variable $g^a$. In one embodiment, the message authentication code (MAC) is a hash message authentication code, implemented with a one-way hash function (e.g., HMAC-MD-5, HMAC-SHA-1, etc.). It should be understood by one skilled in the art that the MAC can be implemented in any other appropriate manner. The notation HMAC(x,y) means that the HMAC message authentication code is generated using the secret x over the message y.

At step 325, WC 220 transmits via connection 230 (FIG. 2) to AP1 210 the first identifier WC-ID, the first variable $g^a$, and the HMAC1 (SSWC, WC-ID|$g^a$). Since AP1 210 does not know the first secret key SSWC, AP1 210 is not able to authenticate WC 220.

At step 330, AP1 210 generates the random number b. The security of the authenticated Diffie-Hellman key agreement protocol depends on a low probability that WC 220 and AP1 210 will generate the same random number twice during their lifetime. Additionally, the security depends on the lack of auto correlation in the random number stream generated by AP1 210.

At step 335, AP1 210 determines a second variable $g^b$, whereas the notation $g^b$ means g raised to the power b modulo m or $[(g^b)\bmod m]$. The generator g and the modulus m are well known. This embodiment implements Diffie-Hellman variables based on modular arithmetic. It should be understood by one of ordinary skill in the art that the Diffie-Hellman variables can be implemented based on elliptic curve cryptography.

At step 340, AP1 210 generates a second message authentication code HMAC2 of a second concatenation (AP-ID|$g^b$) using the second secret key SSAP. The second concatenation (AP-ID|$g^b$) comprises the second identifier AP-ID and the second variable $g^b$. In one embodiment, the message authentication code (MAC) is a hash message authentication code, implemented with a one-way hash function (e.g., HMAC-MD-5, HMAC-SHA-1, etc.). It should be understood by one skilled in the art that the MAC can be implemented in any other appropriate manner. The notation HMAC(x,y) means that the HMAC message authentication code is generated using the secret x over the message y.

At step 342, AP1 210 transmits via connection 240 (FIG. 2) to RADIUS server 250 the first identifier WC-ID, the first variable g^a, the HMAC1 (SSWC, WC-ID|g^a), the second identifier AP-ID, the second variable g^b, and the HMAC2 (SSAP, AP-ID|g^b). The RADIUS server 250 knows the first secret key SSWC and the second secret key SSAP. Thus, the RADIUS server 250 is able to authenticate WC 220 and AP1 210. In one embodiment, the AP1 210 transmits the data to the RADIUS server 250 according to a RADIUS-request protocol.

At step 344, the RADIUS server 250 utilizes the first identifier WD-ID to retrieve the first secret key SSWC. Additionally, the RADIUS server 250 utilizes the second identifier AP-ID to retrieve the second secret key SSAP.

At step 346, the RADIUS server 250 generates a third message authentication code HMAC3 of the first concatenation (WC-ID|g^a) using the first secret key SSWC. Additionally, the RADIUS server 250 generates a fourth message authentication code HMAC4 of the second concatenation (AP-ID|g^b) using the second secret key SSAP.

At step 348, the RADIUS server 250 authenticates WC 220 by verifying HMAC1 matches HMAC3. If the authentication protocol fails, the method of the present invention goes to step 350 and ends. Otherwise, at step 349, the RADIUS server 250 authenticates AP1 210 by verifying HMAC2 matches HMAC4. If the authentication protocol fails, the method of the present invention goes to step 352 and ends.

Otherwise, at step 354, the RADIUS server 250 generates a fifth message authentication code HMAC5 of a third concatenation (WC-Type|WC-ID|g^a|g^b) using the second secret key SSAP. The third concatenation comprises a first designator WC-Type, the first identifier WC-ID, the first variable g^a, and the second variable g^b. The first designator WC-Type specifies that the first identifier WC-ID is that of a wireless client electronic system. In addition, the RADIUS server 250 generates a sixth message authentication code HMAC6 of a fourth concatenation (AP-Type|AP-ID|g^a|g^b) using the first secret key SSWC. The fourth concatenation comprises a second designator AP-Type, the second identifier AP-ID, the first variable g^a, and the second variable g^b. The second designator AP-Type specifies that the second identifier AP-ID is that of a network access point electronic system.

At step 356, the RADIUS server 250 transmits via connection 240 (FIG. 2) to AP1 210 the first designator WC-Type, the first identifier WC-ID, the first variable g^a, the second designator AP-Type, the second identifier AP-ID, the second variable g^b, the HMAC5(SSAP, WC-Type|WC-ID|g^a|g^b), and the HMAC6(SSWC, AP-Type|AP-ID|g^a|g^b). In one embodiment, the RADIUS server 250 transmits the data to AP1 210 according to a RADIUS-Access-Challenge protocol.

At step 358, AP1 210 generates a seventh message authentication code HMAC7 of the third concatenation (WC-Type|WC-ID|g^a|g^b) using the second secret key SSAP.

At step 360, AP1 210 authenticates the RADIUS server 250 by verifying HMAC5 matches HMAC7. The freshness of HMAC5 is ensured by including the second variable g^b in the third concatenation (WC-Type|WC-ID|g^a|g^b). Thus, the AP1 210 avoids replay attacks. Moreover, the first designator WC-Type protects the AP1 210 from communicating with a party that is not a wireless client electronic system. If the authentication protocol fails, the method of the present invention goes to step 362 and ends. Otherwise, at step 365, AP1 210 determines the shared secret key for encrypting communications between AP1 210 and WC 220, whereas the shared secret key is determined by (g^a)^b. The notation (g^a) refers to the first variable g^a. The notation (g^a)^b is used to denote $\{[((g^a) \bmod m)^b] \bmod m\}$.

At step 370, AP1 210 transmits via connection 230 to WC 220 the first variable g^a, the second designator AP-Type, the second identifier AP-ID, the second variable g^b, and the HMAC6(SSWC, AP-Type|AP-ID|g^a|g^b).

At step 375, WC 210 generates an eighth message authentication code HMAC8 of the fourth concatenation (AP-Type|AP-ID|g^a|g^b) using the first secret key SSWC.

At step 380, WC 220 authenticates the RADIUS server 250 by verifying HMAC6 matches HMAC8. The freshness of HMAC6 is ensured by including the first variable g^a in the fourth concatenation (AP-Type|AP-ID|g^a|g^b). Thus, WC 220 avoids replay attacks. Moreover, the second designator AP-Type protects the WC 220 from communicating with a party that is not a network access point electronic system, such as when another wireless client electronic system falsely represents itself as a network access point electronic system. If the authentication protocol fails, the method of the present invention goes to step 382 and ends. Otherwise, at step 384, WC 220 determines the shared secret key for encrypting communications between AP1 210 and WC 220, whereas the shared secret key is determined by (g^b)^a. The notation (g^b) refers to the second variable g^b. The notation (g^b)^a is used to denote $\{[((g^b) \bmod m)^a] \bmod m\}$.

At step 390, the authenticated Diffie-Hellman key agreement protocol has been completed. WC 220 and AP1 210 can engage in secure communications by encrypting any communications transmitted via connection 240 (FIG. 2) with the shared secret key since (g^a)^b=(g^b)^a, i.e, $\{[((g^a) \bmod m)^b] \bmod m\} = \{[((g^b) \bmod m)^a] \bmod m\}$.

Those skilled in the art will recognize that the present invention may be incorporated as computer instructions stored as computer program code on a computer-readable medium such as a magnetic disk, CD-ROM, and other media common in the art or that may yet be developed.

Finally, one of the embodiments of the present invention is an application, namely, a set of instructions (e.g., program code) which may, for example, be resident in the random access memory of an electronic system (e.g., computer system, personal digital assistant or palmtop computer system, etc.). Until required by the computer system, the set of instructions may be stored in another computer memory, for example, in a hard drive, or in a removable memory such as an optical disk (for eventual use in a CD-ROM) or floppy disk (for eventual use in a floppy disk drive), or downloaded via the Internet or other computer network. Thus, the present invention may be implemented as a computer program product for use in an electronic system (e.g., computer system, personal digital assistant, etc.). In addition, although the various methods of the present invention described above are conveniently implemented in an electronic system selectively activated or reconfigured by software, one of ordinary skill in the art would also recognize that such methods of the present invention may be carried out in hardware, firmware, or in a more specialized apparatus constructed to perform the required methods of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of performing an authenticated Diffie-Hellman key agreement protocol over a network between a first communicator sharing a first secret key with an authentication resource (AR) and a second communicator sharing a second secret key with said AR, said method comprising the steps of:
   a) generating a first message authentication code (MAC) of a first variable using said first secret key for said first communicator;
   b) generating a second MAC of a second variable using said second secret key for said second communicator;
   c) transmitting over said network to said AR said first variable, said second variable, a first identifier corresponding to said first communicator, a second identifier corresponding to said second communicator, said first MAC, and said second MAC, wherein said AR is configured for determining a secret key corresponding to an identifier transmitted over said network;
   d) generating a third MAC of said first variable using said first secret key determined by said AR from said first identifier and a fourth MAC of said second variable using said second secret key determined by said AR from said second identifier;
   e) if said first MAC matches said third MAC and said second MAC matches said fourth MAC, generating a fifth MAC of said second variable using said second secret key determined by said AR from said second identifier and a sixth MAC of said first variable using said first secret key determined by said AR from said first identifier;
   f) transmitting over said network to said second communicator said fifth MAC, said first variable, said second variable, and said first identifier;
   g) generating a seventh MAC of said second variable using said second secret key for said second communicator;
   h) transmitting over said network to said first communicator said sixth MAC, said first variable, said second variable, and said second identifier;
   i) generating an eighth MAC of said first variable using said first secret key for said first communicator; and
   j) if said fifth MAC matches said seventh MAC and said sixth MAC matches said eighth MAC, generating a shared secret key based on said first variable for said second communicator and said shared secret key based on said second variable for said first communicator, wherein said shared secret key facilitates encrypted communication between said first communicator and said second communicator.

2. A method as recited in claim 1 wherein said first variable is generated based on a first random number generated by said first communicator.

3. A method as recited in claim 1 wherein said second variable is generated based on a second random number generated by said second communicator.

4. A method as recited in claim 1 wherein said first variable and said second variable are generated based on modular arithmetic.

5. A method as recited in claim 1 wherein said first variable and said second variable are generated based on elliptic curve cryptography.

6. A method as recited in claim 1 wherein said first MAC, said second MAC, said third MAC, said fourth MAC, said fifth MAC, said sixth MAC, said seventh MAC, and said eighth MAC are generated based on a one-way hash function.

7. A method as recited in claim 1 wherein said first MAC is generated based on a concatenation comprising said first identifier and said first variable.

8. A method as recited in claim 1 wherein said second MAC is generated based on a concatenation comprising said second identifier and said second variable.

9. A method as recited in claim 1 wherein said third MAC is generated based on a concatenation comprising said first identifier and said first variable.

10. A method as recited in claim 1 wherein said fourth MAC is generated based on a concatenation comprising said second identifier and said second variable.

11. A method as recited in claim 1 wherein said fifth MAC is generated based on a concatenation comprising said first identifier, said first variable, and said second variable.

12. A method as recited in claim 11 wherein step f) further comprises transmitting over said network to said second communicator a first designator for identifying a designation associated with said first communicator such that the second communicator can determine whether to communicate with said first communicator.

13. A method as recited in claim 12 wherein said fifth MAC is generated based on said concatenation further comprising said first designator.

14. A method as recited in claim 13 wherein said seventh MAC is generated based on a second concatenation comprising said first identifier, said first designator, said first variable, and said second variable.

15. A method as recited in claim 1 wherein said sixth MAC is generated based on a concatenation comprising said second identifier, said first variable, and said second variable.

16. A method as recited in claim 15 wherein step h) further comprises transmitting over said network to said first communicator a second designator for identifying a designation associated with said second communicator such that the first communicator can determine whether to communicate with said second communicator.

17. A method as recited in claim 16 wherein said sixth MAC is generated based on said concatenation further comprising said second designator.

18. A method as recited in claim 17 wherein said eighth MAC is generated based on a second concatenation comprising said second identifier, said second designator, said first variable, and said second variable.

19. A method as recited in claim 1 wherein said seventh MAC is generated based on a concatenation comprising said first identifier, said first variable, and said second variable.

20. A method as recited in claim 1 wherein said eighth MAC is generated based on a concatenation comprising said second identifier, said first variable, and said second variable.

21. A method as recited in claim 1 wherein said network is a wireless network.

22. A method as recited in claim 1 wherein said first communicator comprises a wireless client electronic system.

23. A method as recited in claim 22 wherein said first identifier corresponds to said wireless client electronic system.

24. A method as recited in claim 1 wherein said second communicator comprises a wireless network access point electronic system.

25. A method as recited in claim 24 wherein said second identifier corresponds to said wireless network access point electronic system.

26. A method as recited in claim 1 wherein said authentication resource comprises a RADIUS server.

27. A method as recited in claim 1 wherein said authentication resource comprises a RADIUS server and a backend server coupled to said RADIUS server.

28. A network comprising:
an authentication resource (AR);
a network access point electronic system (AP) coupled to said AR; and
a client electronic system (client) coupled to said AP via a connection, wherein said AR shares a first secret key with said client and shares a second secret key with said AP,
wherein said client is configured to generate a first message authentication code (MAC) of a first variable using said first secret key,
wherein said client is configured to transmit via said AP to said AR said first variable, said first MAC, and a first identifier corresponding to said client,
wherein said AP is configured to generate a second MAC of a second variable using said second secret key,
wherein said AP is configured to transmit to said AR said second variable, said second MAC, and a second identifier corresponding to said AP,
wherein said AR is configured to determine a secret key corresponding to an identifier transmitted over said network, is configured to generate a third MAC of said first variable using said first secret key determined from said first identifier, and is configured to generate a fourth MAC of said second variable using said second secret key determined from said second identifier,
wherein said AR is configured to generate a fifth MAC of said second variable using said second secret key and is configured to generate a sixth MAC of said first variable using said first secret key if said first MAC matches said third MAC and said second MAC matches said fourth MAC,
wherein said AR is configured to transmit to said AP said fifth MAC, said first variable, said second variable, and said first identifier,
wherein said AR is configured to transmit via said AP to said client said sixth MAC, said first variable, said second variable, and said second identifier,
wherein said AP is configured to generate a seventh MAC of said second variable using said second secret key and is configured to generate a shared secret key based on said first variable if said fifth MAC matches said seventh MAC,
wherein said shared secret key facilitates encrypted communication between said AP and said client, and
wherein said client is configured to generate an eighth MAC of said first variable using said first secret key and is configured to generate said shared secret key based on said second variable if said sixth MAC matches said eighth MAC.

29. A network as recited in claim 28 wherein said first variable is generated based on a first random number generated by said client electronic system.

30. A network as recited in claim 28 wherein said second variable is generated based on a second random number generated by said network access point electronic system.

31. A network as recited in claim 28 wherein said first variable and said second variable are generated based on modular arithmetic.

32. A network as recited in claim 28 wherein said first variable and said second variable are generated based on elliptic curve cryptography.

33. A network as recited in claim 28 wherein said first MAC, said second MAC, said third MAC, said fourth MAC, said fifth MAC, said sixth MAC, said seventh MAC, and said eighth MAC are generated based on a one-way hash function.

34. A network as recited in claim 28 wherein said first MAC is generated based on a concatenation comprising said first identifier and said first variable.

35. A network as recited in claim 28 wherein said second MAC is generated based on a concatenation comprising said second identifier and said second variable.

36. A network as recited in claim 28 wherein said third MAC is generated based on a concatenation comprising said first identifier and said first variable.

37. A network as recited in claim 28 wherein said fourth MAC is generated based on a concatenation comprising said second identifier and said second variable.

38. A network as recited in claim 28 wherein said fifth MAC is generated based on a concatenation comprising said first identifier, said first variable, and said second variable.

39. A network as recited in claim 38 wherein said authentication resource is configured to transmit to said network access point electronic system a first designator for identifying a designation associated with said client electronic system such that the network access point electronic system can determine whether to communicate with said client electronic system.

40. A network as recited in claim 39 wherein said fifth MAC is generated based on said concatenation further comprising said first designator.

41. A network as recited in claim 40 wherein said seventh MAC is generated based on a second concatenation comprising said first identifier, said first designator, said first variable, and said second variable.

42. A network as recited in claim 28 wherein said sixth MAC is generated based on a concatenation comprising said second identifier, said first variable, and said second variable.

43. A network as recited in claim 42 wherein said authentication resource is configured to transmit via said network access point electronic system to said client electronic system a second designator for identifying a designation associated with said network access point electronic system such that the client electronic system can determine whether to communicate with said network access point electronic system.

44. A network as recited in claim 43 wherein said sixth MAC is generated based on said concatenation further comprising said second designator.

45. A network as recited in claim 44 wherein said eighth MAC is generated based on a second concatenation comprising said second identifier, said second designator, said first variable, and said second variable.

46. A network as recited in claim 28 wherein said seventh MAC is generated based on a concatenation comprising said first identifier, said first variable, and said second variable.

47. A network as recited in claim 28 wherein said eighth MAC is generated based on a concatenation comprising said second identifier, said first variable, and said second variable.

48. A network as recited in claim 28 wherein said network is a wireless network.

49. A network as recited in claim 28 wherein said client electronic system comprises a wireless client electronic system.

50. A network as recited in claim 49 wherein said first identifier corresponds to said wireless client electronic system.

51. A network as recited in claim 28 wherein said network access point electronic system comprises a wireless network access point electronic system.

52. A network as recited in claim 51 wherein said second identifier corresponds to said wireless network access point electronic system.

53. A network as recited in claim 28 wherein said authentication resource comprises a RADIUS server.

54. A network as recited in claim 28 wherein said authentication resource comprises a RADIUS server and a backend server coupled to said RADIUS server.

55. A network as recited in claim 28 wherein said connection is a wireless connection.

* * * * *